United States Patent [19]

Folk

[11] Patent Number: 4,817,781
[45] Date of Patent: Apr. 4, 1989

[54] RESILIENT BELT TYPE CONVEYOR HAVING IMPROVED LOADING AND UNLOADING FEATURES

[75] Inventor: Kenneth F. Folk, Harrisburg, Pa.

[73] Assignee: AMP Incorporated, Harrisburg, Pa.

[21] Appl. No.: 128,123

[22] Filed: Dec. 3, 1987

[51] Int. Cl.[4] .............................................. B65G 15/14
[52] U.S. Cl. ...................................... 198/627; 29/822
[58] Field of Search ............... 198/627, 628; 29/33 M, 29/759, 822

[56] References Cited

U.S. PATENT DOCUMENTS

| | | |
|---|---|---|
| 3,019,679 | 2/1962 | Schwalm et al. . |
| 3,062,390 | 11/1962 | Schwalm et al. . |
| 3,369,434 | 2/1968 | Schwalm . |
| 3,372,815 | 3/1968 | Lovendusky . |
| 3,612,369 | 10/1971 | Grebe et al. . |
| 3,766,624 | 10/1973 | Grebe et al. . |
| 3,874,077 | 4/1975 | Folk . |
| 3,875,662 | 4/1975 | Folk . |
| 3,887,999 | 6/1975 | Ross et al. . |
| 4,043,494 | 8/1977 | Bickford et al. .................. 83/241 X |
| 4,089,405 | 5/1978 | Loomis et al. ..................... 29/759 X |
| 4,135,378 | 1/1979 | Balon ................................ 83/208 X |
| 4,192,207 | 3/1980 | Bickford et al. ......................... 83/42 |
| 4,489,476 | 12/1984 | Over et al. ...................... 29/33 M X |
| 4,493,233 | 1/1985 | Dusel et al. ........................ 83/151 X |
| 4,502,586 | 3/1985 | Dusel et al. ........................ 29/753 X |
| 4,585,432 | 4/1986 | Marysse .......................... 198/627 X |
| 4,653,160 | 3/1987 | Thorkildsen et al. ............. 29/33 M |
| 4,690,266 | 9/1987 | Croman et al. ..................... 198/388 |

Primary Examiner—Robert J. Spar
Assistant Examiner—Cheryl L. Gastineau
Attorney, Agent, or Firm—William B. Noll

[57] ABSTRACT

Conveyer for wires comprises first and second endless belts which are in side by side coplanar relationship. The conveyer has a feeding stretch which comprises portions of the belts which are in opposed confronting relationship. The feeding stretch portion of the first belt is longer than the feeding stretch portion of the second belt so that there is an overlapping portion of the first belt. The second belt is shiftable between a loading position and an unloading position. In the loading position, the overlapping portion of the first belt is located at the loading end of the conveyer so that a wire can be placed on the overlapping portion. In the unloading position, the overlapping portion of the first belt is at the discharge end of the conveyer. The wire on the overlapping portion can thus be removed.

15 Claims, 8 Drawing Sheets

RESILIENT BELT TYPE CONVEYOR HAVING IMPROVED LOADING AND UNLOADING FEATURES

BACKGROUND OF THE INVENTION

U.S Pat. Nos. 4,502,586, 4,653,160, and 4,493,233 describe harness making or lead making machines of the type in which the wires are conveyed by an indexable conveyer past one or more wire processing machines such as a wire stripper or crimping machines. The conveyers described in the above-identified U.S. patents are in the form of two endless belts of resilient material which are in side by side coplanar relationship. The belts each have a feeding stretch which extends from the loading end of the conveyer to the discharge end of the conveyer, the feeding stretches of the two belts being opposed to each other and resiliently pressed against each other so that the wires will be gripped between the opposed surfaces of the belts.

For several reasons, it is essential that the wires which are loaded onto the conveyer be precisely positioned so that when the conveyer is indexed and the wires are presented to wire processing machines, the individual wires will, in fact, be accurately located or centered with respect to the processing machine. For example, if a wire is presented to a crimping press, it is essential that the end of the wire be located between the crimping die and the crimping anvil so that when the die moves towards the anvil, the wire will be pushed into a terminal on the anvil and the terminal will be crimped onto the wire. Precise location of each wire in the conveyer requires that the wire be precisely located in the conveyer when it is loaded onto the conveyer. The above-identified U.S. patents achieve such precise location by moving the two belts of the conveyer apart at the loading end and the wire is then located between the two belts by a wire delivery system. When the belts are moved back together, the wire will be precisely located between them relative to the conveying path so that the wire will subsequently be precisely located with respect to the wire processing machines.

The present invention is directed to the achievement of a resilient belt type conveyer having improved wire loading and wire unloading features which avoid the necessity of moving the belts apart at the loading end or at the discharge end. Conveyers in accordance with the invention can be used on most, if not all of the known types of lead making and harness making machines which require indexable conveyers.

THE INVENTION

In accordance with one aspect thereof, the invention comprises a conveyer for transporting wires laterally of their axes along a conveyer path. The conveyer comprises first and second belt assemblies in side by side coplanar relationship, each belt assembly comprising an endless belt of resilient material having a feeding stretch, a return stretch, and two curving ends. The feeding stretches of the first and second belts are in opposed confronting relationship. The conveyer has a loading end and a discharge end and the feeding stretches of the first and second belts extend between the ends. Actuating means are provided for intermittently indexing the belts so that wires held between the feeding stretches of the belts are conveyed along the conveying path. The conveyer is characterized in that the first and second belts each have loading end portions and discharge end portions which are at the loading end and at the discharge end respectively of the feeding stretch. At least one of the end portions of the second belt is shiftable, with respect to the corresponding end portion of the first belt between a juxtaposed position and a spaced position. The one end portion of the second belt is against the corresponding end portion of the first belt when the one end portion of the second belt is in the juxtaposed position. The one end portion of the second belt is spaced from the corresponding end portion of the first belt when the one end portion of the second belt is in its spaced position, the corresponding end portion of the first belt being thereby exposed when the one end portion of the second belt is in its spaced position. A wire can therefore be placed on, or removed from, the corresponding end portion of the first belt when it is exposed and the one end portion of the second belt is in its spaced position. In one embodiment, both of the end portions of the second belt are shiftable between the juxtaposed and spaced positions.

In accordance with a further embodiment, the feeding stretch of the first belt is longer than the feeding stretch of the second belt so that the feeding stretch of the first belt has an overlapping portion which overlaps the feeding stretch of the second belt. One of the belts is a shiftable belt, the shiftable belt being shiftable relative to the other belt in the direction of wire feed or conveyance between a loading position and an unloading position. The overlapping portion of the first belt overlaps the feeding stretch of the second belt at the loading end of the conveyer when the shiftable belt is in the loading position. The overlapping portion of the first belt overlaps the feeding portion of the second belt of the unloading end when the shiftable belt is in the unloading position. Wires can thus be placed on or removed from the overlapping portion of the first belt.

THE DISCLOSED EMBODIMENT

Referring first to FIGS. 1-4, a conveyer assembly 2 in accordance with the invention comprises first and second belts 4, 6 of resilient compressible material which are in side by side coplanar relationship. The first belt has a feeding course 8 and the second belt has a feeding course 10, the feeding courses of the belts being in opposed confronting relationship so that wires 5 will be gripped between their surfaces as shown. The first and second belts have return courses 12, 14 and extend around pulleys 16, 18, 20, 22 at the ends of the conveyer. The wires are loaded onto the loading end 24 and are removed from the conveyer at the discharge end 26. The feeding course 8 of the first belt is somewhat longer than the feeding course 10 of the second belt so that the first belt overlaps the second belt as shown at 28, FIG. 3 and at 30 in FIG. 1. The second belt is shiftable between the positions of FIG. 1 and FIG. 3 to permit loading and unloading; that is, wires can be placed on the exposed overlap portion 28 in FIG. 3 and can be removed from the overlap portion 30 in FIG. 1.

Figure 3:
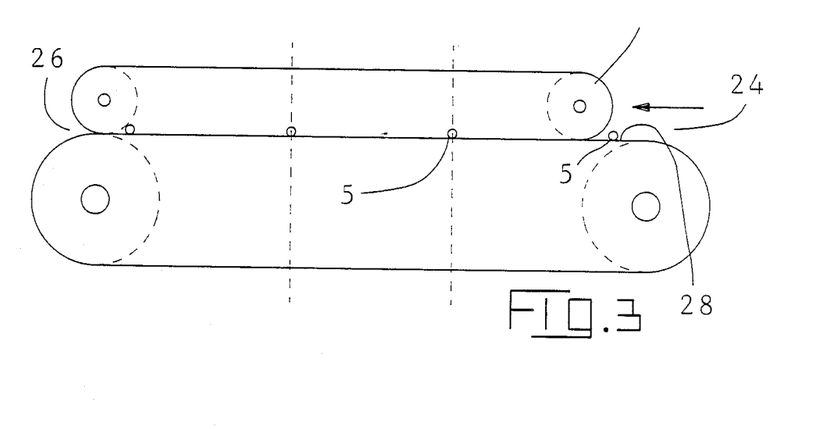
Figure 4:
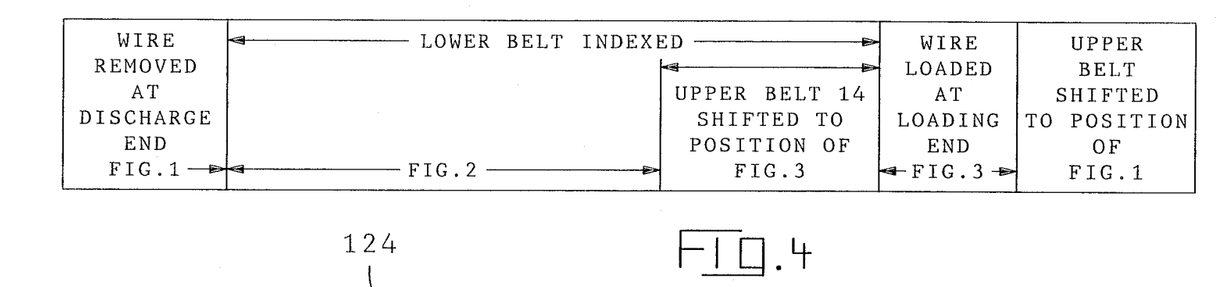
FIG. 4 is a timing diagram which describes an operating cycle of the conveyer.
Figure 5:
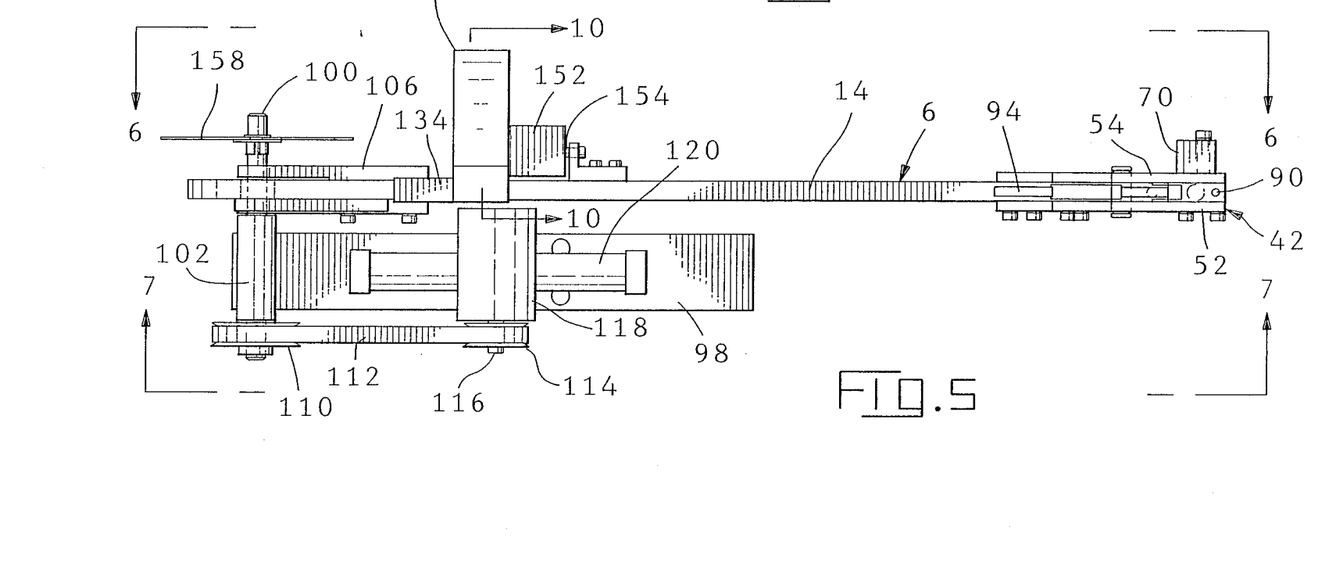
FIG. 5 is a top plan view of a conveyer in accordance with the invention.
Figure 6:
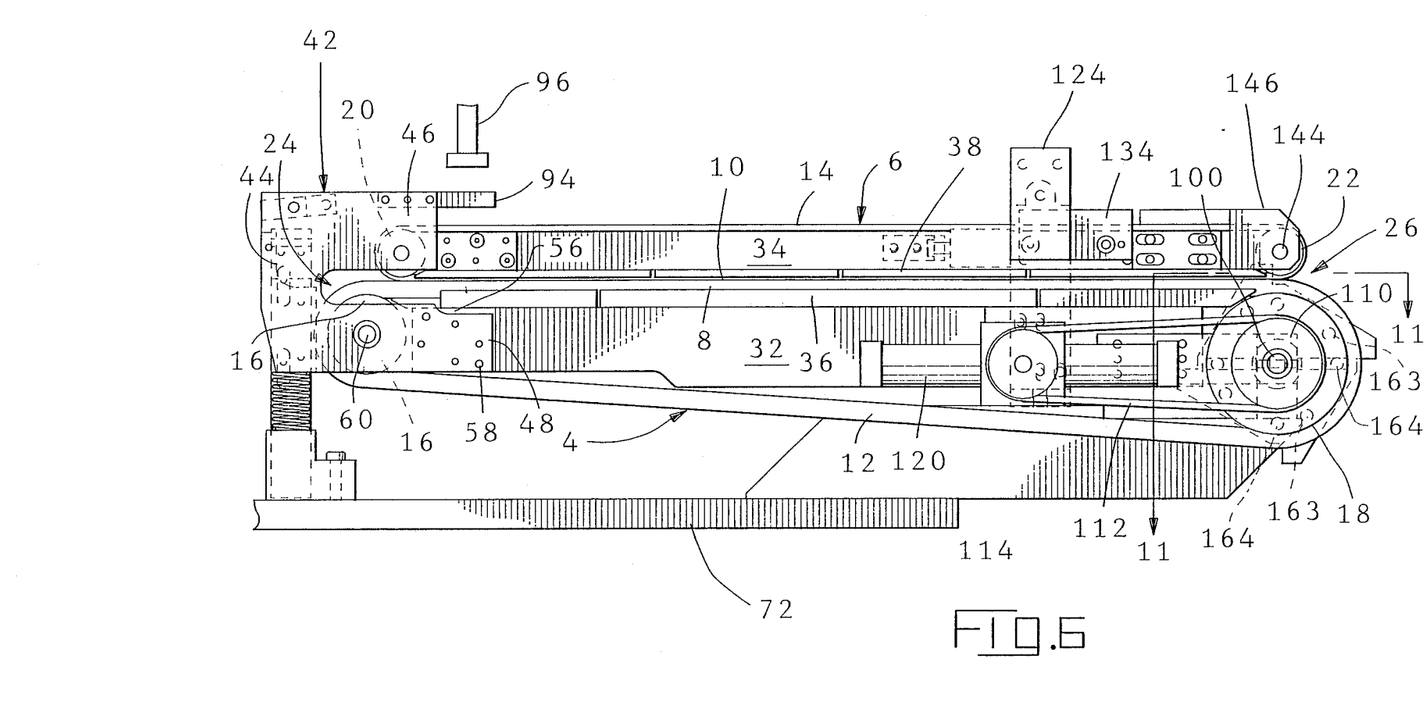
FIGS. 6 and 7 are side views looking in the direction of the arrows 6—6 and 7—7 of FIG. 5.

An operating cycle is described in the timing diagram, FIG. 4. In this figure, it is assumed that the second belt 6 is initially in the position of FIG. 1 so that the exposed lead on the overlap portion 30 can be removed. Thereafter, the indexing mechanism rotates the pulley 18 to drive the first belt and the second belt is driven by virtue of the contact with the first belt along the feeding courses. During indexing as shown in FIG. 4, the second belt is shifted to the position of FIG. 3 so that the overlap 28 is now provided at the loading end 24 of the conveyer. The indexing and shifting operations cease simultaneously so a short interval is provided to load a wire onto the overlap 28. Thereafter, the second belt 6 is shifted back to the position of FIG. 1 so that the wire at the discharge end can be removed. The second belt is thus shifted from the position of FIG. 1 to the position of FIG. 3 during the indexing portion of the cycle and is shifted back to the position of FIG. 1 during the interval between successive indexing intervals.

Figure 7:
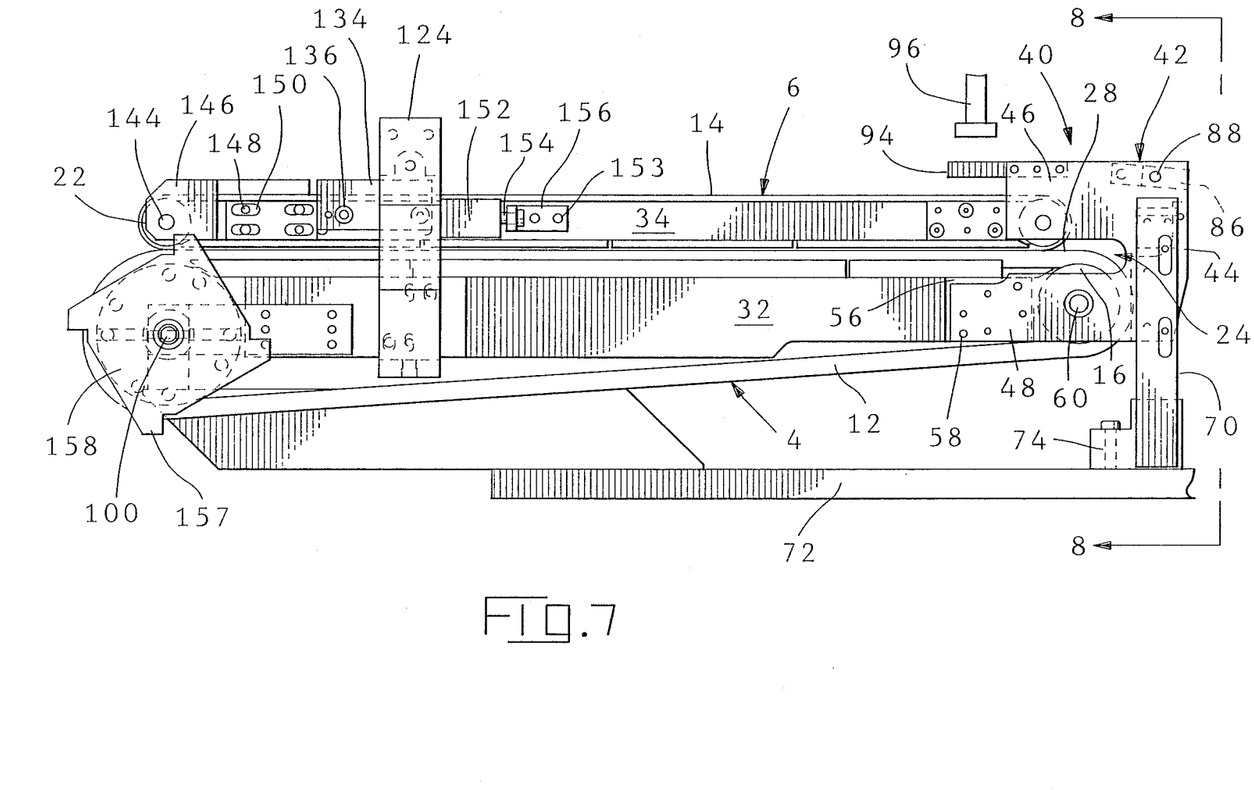

Referring now to FIGS. 5-11, the disclosed embodiment comprises first and second elongated plate-like belt guides 32, 34 around which the belts extend. Channel-shaped belt tracks 36, 38 are provided on the adjacent edges of the plates 32, 34 and serve to contain the belts in the feeding course of the conveyer. The loading end 24 of the conveyer assembly, the right-hand end as viewed in FIG. 7, is secured to a support structure 40 comprising a generally U-shaped floating frame member 42 which is resiliently supported on the upper end of a column 70.

The frame member 42 has a web 44 and upper and lower arms 46, 48. This frame member is a composite member having a central block 50, FIG. 8, in the web section and relatively thin side plates 52, 54. The pulley 16 for the first or lower belt 4 is rotatably mounted on a pin 60 which is supported in the side plates 52,54 of the lower arm portion of the frame member 42. The ends of these side plates are secured to a reduced thickness portion 56 of guide plate 32 by fasteners 58.

Figure 9:
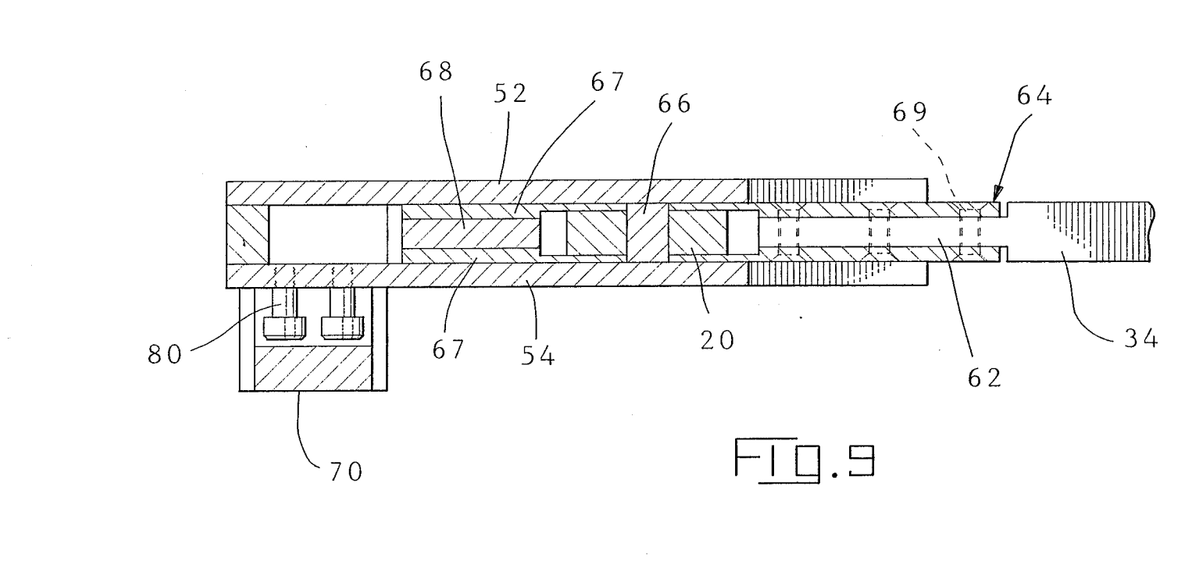
FIG. 9 is a view looking in the direction of the arrows 9—9 in FIG. 8.

The upper guide plate 34 around which the second belt extends, has a reduced thickness end section 62, FIG. 9, which is secured to a pulley mounting assembly 64 which is contained between the side plates 52, 54 in the upper ear portion 46 of the mounting frame 42. The pulley 20 is rotatably supported on a pin 66 which extends between, and is supported in two relatively thin plates 67. The plates 67 extend leftwardly as viewed in FIG. 9 and are spaced apart by a suitable spacer 68. The plates 67 and spacer 68 are secured to each other by flat headed fasteners 69. The entire structure, as mentioned above, is slidably supported between the opposed surfaces of the side plates 52, 54 in the upper arm in order to permit shifting of the upper belt.

Figure 8:
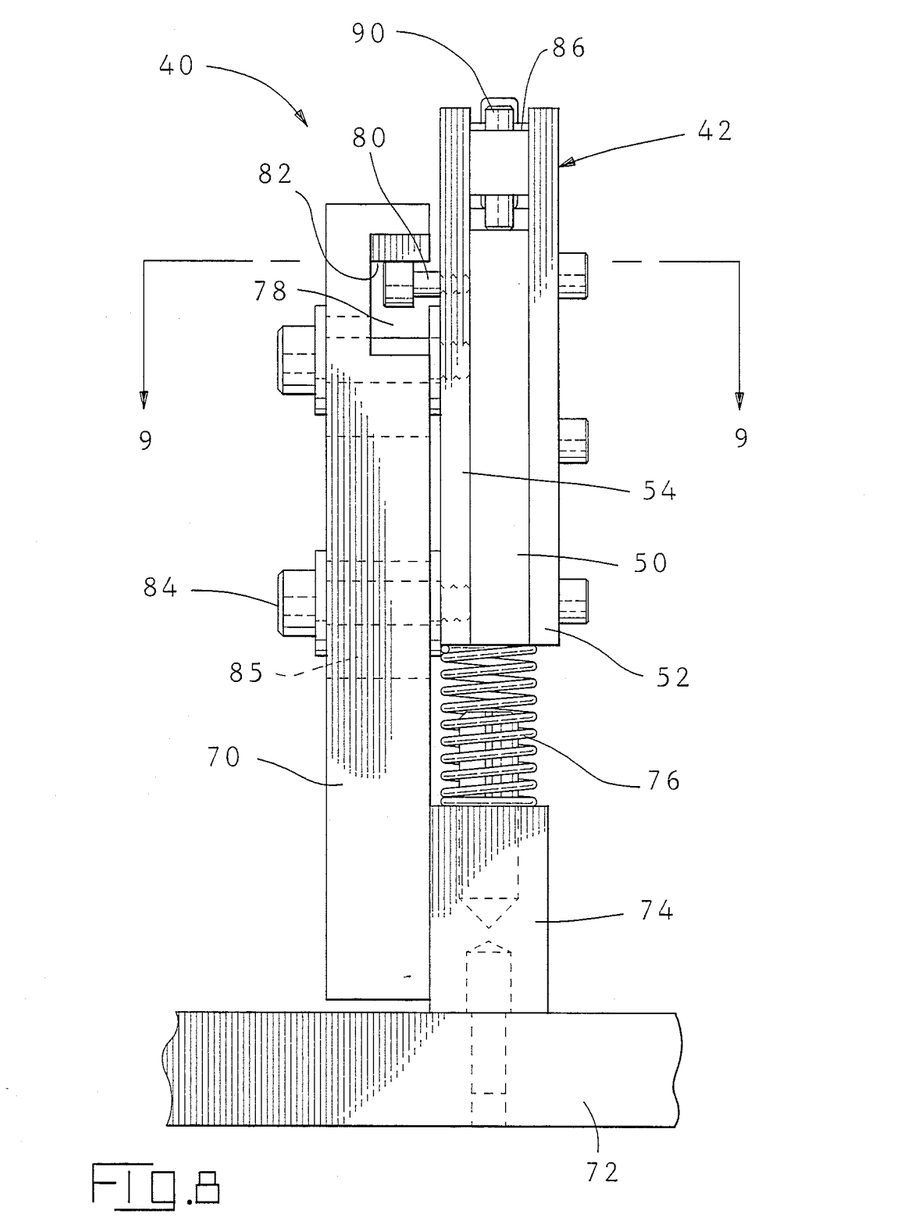
FIG. 8 is a view looking in the direction of the arrows 8—8 in FIG. 7.

The column 70 which supports the belt supporting assembly 40 is mounted on a base plate 72 by means of a mounting block 74. As shown in FIG. 8, the column extends beside the belt supporting assembly 42 and the block 74 is beneath the belt supporting assembly 42. A spring 76 is provided which biases the entire belt supporting assembly 42 upwardly as viewed in FIG. 8. Stop screws 80 extend from the side plate 54 and into a recess 78 in the upper end of the column. These stop screws bear against the downwardly facing surface 82 of the recess and limit the upward movement of the assembly 42 under the influence of the spring 76. Additionally, the belt supporting assembly 42 is slidably connected to the column 70 by screws 84 which extend through slots 85 in the column. This arrangement permits the entire conveyer assembly to be deflected downwardly by a slight distance in order that wires carried in the conveyer can be lowered into a crimping anvil when the wires are presented to a crimping press or the like. To this end, an extension 94 is provided between the side plates 52, 54 and this extension is intended to be engaged by the depressor 96 which may extend from the ram of a press or which may be on the end of a piston rod. In other words, when the depressor 96 moves downwardly from the position shown, the entire assembly (the guide plates 32, 34, the belts 2, 4, and the frame assembly 42) is pivoted downwardly so that the wires held in the conveyer will be lowered.

It is desirable to provide a means for adjusting the force with which the second or upper belt is urged downwardly against the first or lower belt in the frame assembly 42. In the disclosed embodiment, a bell crank 86 (FIG. 12) is pivotally mounted on a pivot pin 88 between the plates 52, 54 and has a roller 92 on one arm thereof which bears against the upper surface of the pulley mounting assembly 64. The other arm of the bell crank has a set screw 90 threaded therethrough which bears against the upper surface of the spacer block 50 as shown in FIG. 8. Adjustment of the set screw causes the roller to move relatively upwardly or downwardly by a slight amount, thereby decreasing or increasing the force with which the second or upper belt 6 is urged against the lower belt 4. A roller 92 is required for the reason that the upper belt moves relative to the end of this bell crank arm during shifting of the second belt.

The left-hand end of the entire conveyer assembly as viewed in FIG. 7 is pivotally supported by the drive shaft 100 of the pulley 18. This drive shaft extends through a suitable bearing 102 (FIG. 5) which is mounted on an adapter plate 98 which in turn is mounted on the base plate 72. The shaft 100 has a pulley 110 on its end which is coupled by belt 112 to the output pulley 114 on the output shaft 116 of the actuator 118. The actuator comprises a piston cylinder 120 which is coupled through a ratchet mechanism to the shaft 116 in a manner such that during each operating cycle, the pulley 114 on shaft 116 is rotated through 360 degrees causing the pulley 110 and the drive shaft 100 to be rotated through an angle of 90 degrees.

The drive shaft 100 is secured to the lower guide plate 32 by means of spaced-apart support plates 106 (FIG. 11) secured as by fasteners 108 to the guide plate 32. The plates 106 have spaced-apart ears between which the pulley is received and through which the drive shaft extends.

The second belt and the guide plate 34 are held against the first belt at the left-hand end of the conveyer assembly by means of a clevis-like member 124 which has a lower arm 126 and an upper arm 127. The lower arm 126 has its end against the lower guide plate 32 and is adjustably secured to this guide plate by means of fasteners 128 which extend through slots in the plate 32.

A set screw 130 is provided in the lower arm which bears against the downwardly facing edge of plate 32. By means of this set screw 130, the clevis-like block 124 can be moved relatively upwardly with respect to the die plate 32.

Figure 10:
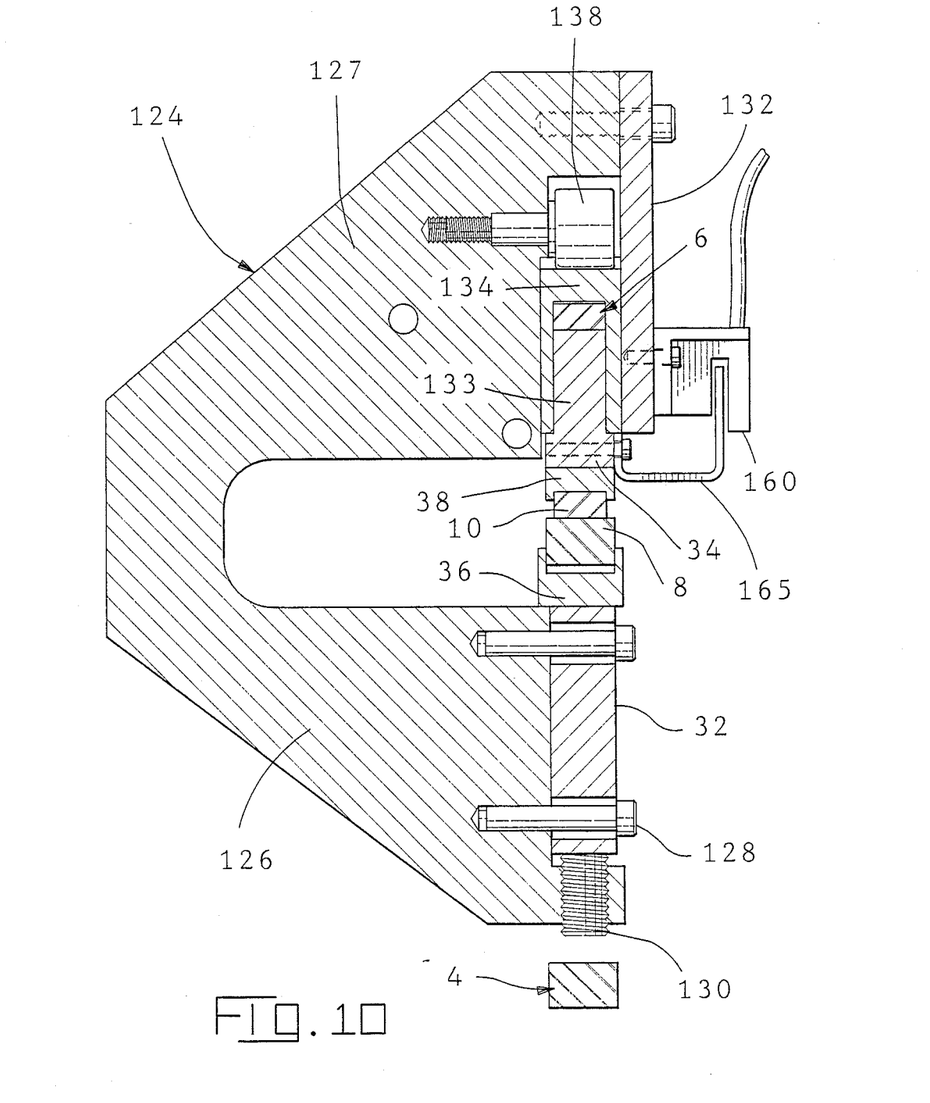
FIG. 10 is a view looking in the direction of the arrows 10—10 in FIG. 5.
Figures 11, 12:
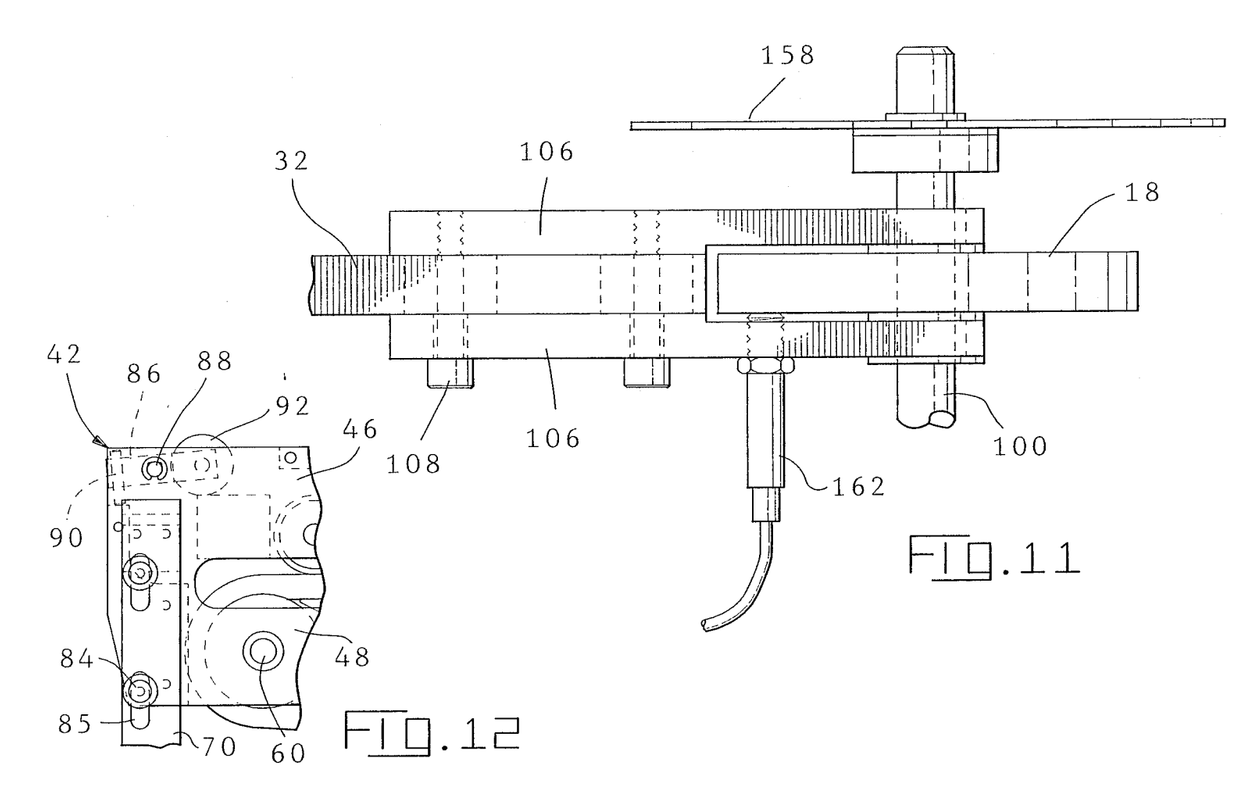
FIG. 11 is a view looking in the direction of the arrows 11—11 in FIG. 6.
FIG. 12 is an enlarged fragmentary view which shows an adjusting feature.

The upper arm 127 of the clevis member is not secured to the upper guide plate 32 but functions as a guide for the guide plate itself when shifting takes place. It also serves to urge the guide plate, and therefore the second belt 6, downwardly against the first belt 4 in order to maintain the proper degree of compression to grip the wires 5. The upper arm 127 has a plate 132 secured to its face and this plate extends over a channel-shaped guide member 134 which receives the belt and a reduced a thickness portion 133 of the guide plate 34 as shown in FIG. 10. This guide plate 134 in turn extends leftwardly, as viewed in FIG. 7, beyond the clevis member 124 and is secured to the guide plate 34 by fasteners 136. A roller 138 is mounted in the upper arm 127 and bears against the upwardly facing surface of the U-shaped guide member 134 to permit this guide member to move relative to the fixed clevis member 127 during shifting.

The pulley 22 for the second belt is rotatably mounted on a pin 144 which in turn is carried by a mounting block 146 at the left-hand end of the conveyer assembly as viewed in FIG. 7. The mounting block 146 has a reduced thickness portion which extends into a slot in the left-hand end portion of the guide plate 34 and is secured thereto by suitable fasteners 148 which extend through oversize slots 150 in the plate 34. This pin-slot fastening means is provided in order to permit adjustment of the position of the block 146 and thereby permit adjustment of the tension in the second belt.

Figure 1:
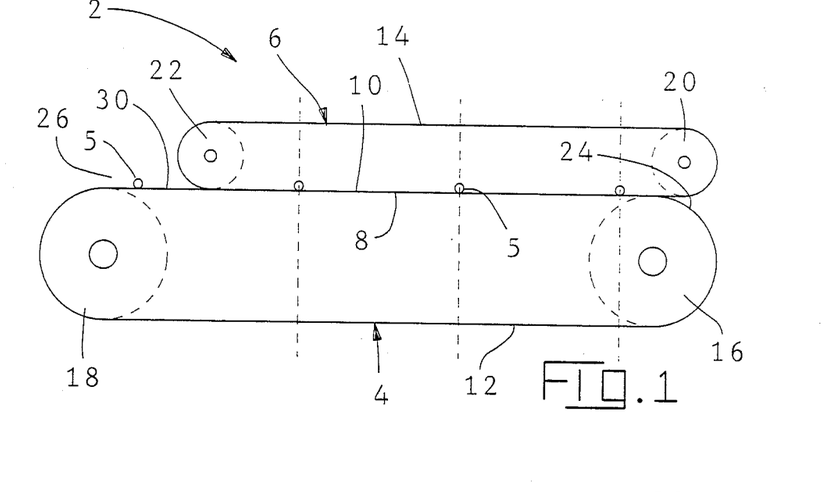
FIGS. 1-3 are diagrammatic views which illustrate the principles of the invention.
Figure 2:
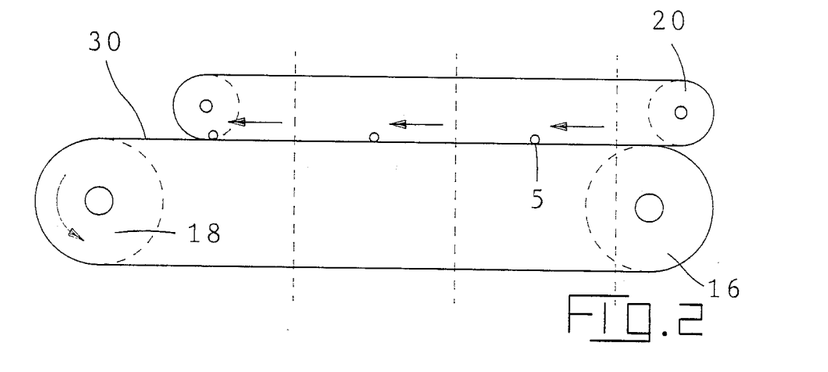

The actuator for shifting the second belt assembly between the positions of FIGS. 1 and 3 comprises a cylinder 152 which is secured to the stationary clevis member 124 and which has a piston rod 154 which is secured to a bracket 156. The bracket 156 is secured by suitable fasteners 153 to the guide plate 34 so that movement of the piston rod 154 causes movement of the guide plate 34 and, therefore, movement of the second belt between its two positions.

A variety of control systems for the conveyer assembly as described above may be provided and any particular machine with which the conveyer is used will require its own control system. In general, a proximity sensor or a photo-electric unit 162 can be provided adjacent to the driven pulley 18. The pulley is provided with openings 164 at 90 degree intervals and these openings are detected by the detector 162. The signal from the detector can thus be used to start and stop the indexing actuator. Additional openings 163 are provided in the pulley which are also detected by detector 162 during indexing. These openings control the actuator 152 which shifts the upper belt during indexing. The shifting of the second belt is monitored by a detector 160 which is mounted on the plate 132. This plate is stationary in that it is secured to the clevis member 134. The detector detects an arm 165 which is secured to the guide plate 34 as shown in FIG. 10.

The disclosed embodiment is provided with a wire deflector 158 on the shaft 100 at the discharge end of the feeding course of the conveyer. This deflector has ears 157 extending therefrom at 90 degree intervals which engage the wire at the discharge station and flex it slightly so that its outer end will be precisely positioned and can be picked up by a suitable transfer mechanism. The deflector is particularly useful if the wires being transported are relatively limp. Limp wire has a tendency to dangle and the end of a limp wire will not necessarily be in axial alignment with the portion of the wire which is held between the opposed surfaces of the belts 2, 4.

It will be apparent from the foregoing description that a conveyer assembly can be used with a wide variety of harness making and lead making machines. The wires can be delivered to the loading end of the conveyer in any suitable manner, for example, the wires might be axially fed to the overlapping portion 28 shown in FIG. 6 or they might be delivered by a mechanism which would deposit them on the surface of this overlapping portion. Similarly, the wires can be removed at the discharge end by jaw members or the like which close upon the wires and deliver them to a further processing apparatus, for example, a block loader for loading the terminals on the wire into a connector housing.

I claim:

1. A conveyer for transporting wires laterally of their axes along a conveying path, the conveyer comprising first and second belt assemblies in side by side coplanar relationship, each belt assembly comprising an endless belt having a feeding stretch, a return stretch, and two curving ends, the feeding stretches of the first and second belts being in opposed confronting relationship, the conveyer having a loading end and a discharge end, the feeding stretches of the first and second belts extending between the ends, and actuating means for intermittently indexing the belts whereby wires held between the feeding stretches of the belts are conveyed along the conveying path, the conveyer being characterized in that:

the first and second belts each have loading end portions and discharge end portions which are at the loading end and at the discharge end respectively of the feeding stretch, at least one of the end portions of the second belt is shiftable, with respect to the corresponding end portion of the first belt, between a juxtaposed position and a spaced position, the one end portion of the second belt being against the corresponding end portion of the first belt when the one end portion of the second belt is in its juxtaposed position, the one end portion of the second belt being spaced from the corresponding end portion of the first belt when the one end portion of the second belt is in its spaced position, the corresponding end portion of the first belt being thereby exposed when the one end portion of the second belt is in its spaced position whereby, a wire can be placed on, or removed from, the corresponding end portion of the first belt when it is exposed and the one end portion of the second belt is in its spaced position.

2. A conveyer as set forth in claim 1 characterized in that the actuating means comprises means for shifting the one end portion of the second belt between its juxtaposed position and its spaced position in synchronism with indexing of the belts.

3. A conveyer as set forth in claim 2 characterized in that the one portion of the second belt is at the loading end of the conveyer.

4. A conveyer as set forth in claim 2 characterized in that the one portion of the second belt is at the discharge end of the conveyer.

5. A conveyer as set forth in claim 2 characterized in that both of the end portions of the second belt are shiftable.

6. A conveyer assembly for transporting wires laterally of their axes along a conveying path, the conveyer comprising first and second belt assemblies in side by side coplanar relationship, each belt assembly comprising an endless belt having a feeding stretch, a return stretch, and two curving ends, the feeding stretches of the first and second belts being in opposed confronting relationship, the conveyer having a loading end and a discharge end, the feeding stretches of the first and second belts extending between the ends, and actuating means for intermittently indexing the belts whereby wires held between the feeding stretches of the belts are conveyed along the conveying path, the conveyer assembly being characterized in that:

the first and second belts each have loading end portions and discharge end portions which are at the loading end and at the discharge end respectively of the feeding stretch;

the loading end portion and the discharge end portion of the second belt being shiftable, with respect to the loading end portion and the discharge end portion respectively of the first belt, between juxtaposed positions and spaced positions, the loading end portion and the discharge end portion of the second belt being against the loading end portion and the discharge end portion of the first belt respectively when the loading end portion and the discharge end portion of the second belt are in their juxtaposed positions, the loading end portion and the discharge end portion of the second belt being spaced from the loading end portion and the discharge end portion respectively of the first belt when the loading end portion and the discharge end portion of the second belt are in their spaced positions, the loading end portion and the discharge end portions of the first belt being thereby exposed when the loading end portion and the discharge end portion of the second belt are in their spaced positions whereby, a wire can be loaded onto the conveyer assembly when the loading end portion of the second belt is in its spaced position by placing the wire on the exposed loading end portion of the first belt, and a wire can be discharged from the conveyer assembly when the discharge end portion of the second belt is in its spaced position by removing the wire from the exposed discharge end portion of the first belt.

7. A conveyer assembly as set forth in claim 6 characterized in that the actuating means comprises shifting means for shifting the loading end portion and the discharge end portion of the second belt in synchronism with indexing of the belts.

8. A conveyer assembly as set forth in claim 7 characterized in that the second belt is supported on a second belt frame means which is movable relative to the first belt parallel to the conveying path, the shifting means comprising means for moving the second belt frame means.

9. A conveyer for transporting wires laterally of their axes along a conveying path, the conveyer comprising first and second belt assemblies in side by side coplanar relationship, each belt assembly comprising an endless belt having a feeding stretch, a return stretch, and two curving ends, the feeding stretches of the first and second belts being in opposed confronting relationship, the conveyer having a loading end and a discharge end, the feeding stretches of the first and second belts extending between the ends, and actuating means for intermittently indexing the belts whereby wires held between the feeding stretches of the belts are conveyed along the conveying path, the conveyer being characterized in that:

the feeding stretch of the first belt is longer than the feeding stretch of the second belt whereby the feeding stretch of the first belt has an overlapping portion which overlaps the feeding stretch of the second belt, one of the belts is a shiftable belt, the shiftable belt being shiftable relative to the other belt between a loading position and an unloading position, the overlapping portion of the first belt overlapping the feeding stretch of the second belt at the loading end of the conveyer when the shiftable belt is in the loading position, the overlapping portion of the first belt overlapping the feeding stretch of the second belt at the discharge end of the conveyer when the shiftable belt is in the unloading position whereby, ps a wire can be loaded onto the conveyer by placing the wire on the overlapping portion when the shiftable belt is in the loading position, and a wire can be unloaded from the conveyer when the shiftable belt is in the unloading position by removing the wire from the overlapping portion.

10. A conveyer as set forth in claim 9 characterized in that the actuating means comprises shifting means for shifting the one belt.

11. A conveyer as set forth in claim 10 characterized in that the second belt is the shiftable belt.

12. A conveyer as set forth in claim 10 characterized in that the actuating means comprises means for indexing the first belt, the second belt being indexed by the first belt.

13. A conveyer as set forth in claim 12 characterized in that the second belt is shifted from the unloading position to the loading position during indexing of the belts and is shifted to the unloading position during the interval between indexing.

14. A conveyer as set forth in claim 11 characterized in that first and second guide frames are provided for the first and second belts, the first and second belts extending around, and being carried by, the first and second guide frames, the shifting means being supported by the first guide frame and being connected to the second guide frame.

15. A conveyer as set forth in claim 14 characterized in that the shifting means comprises a piston-cylinder.

* * * * *

UNITED STATES PATENT AND TRADEMARK OFFICE
CERTIFICATE OF CORRECTION

PATENT NO. : 4,817,781

DATED : April 4, 1989

INVENTOR(S) : Kenneth F. Folk

It is certified that error appears in the above-identified patent and that said Letters Patent is hereby corrected as shown below:

Column 8, Claim 9, line 32, "whereby, ps a wire" should read

-- whereby, a wire --.

Signed and Sealed this

Twentieth Day of June, 1989

Attest:

DONALD J. QUIGG

*Attesting Officer*  *Commissioner of Patents and Trademarks*